United States Patent [19]

Kraus

[11] 4,349,808
[45] Sep. 14, 1982

[54] BOLOMETER

[75] Inventor: Heinz Kraus, Traunreut, Fed. Rep. of Germany

[73] Assignee: Dr. Johannes Heidenhain GmbH, Traunreut, Fed. Rep. of Germany

[21] Appl. No.: 147,842

[22] Filed: May 8, 1980

[30] Foreign Application Priority Data

May 23, 1979 [DE] Fed. Rep. of Germany ....... 2920901

[51] Int. Cl.³ .......................................... H01L 31/08
[52] U.S. Cl. .................................................... 338/18
[58] Field of Search .................... 338/18, 15, 307–309; 73/355 R; 250/338

[56] References Cited

U.S. PATENT DOCUMENTS

| 2,414,792 | 1/1947 | Becker | 338/18 |
| 2,966,646 | 12/1960 | Baasch | 338/22 R |
| 3,054,977 | 9/1962 | Baasch | 338/15 X |
| 3,337,830 | 8/1967 | Levy | 338/15 |
| 3,420,688 | 1/1969 | Norton | 338/18 |
| 3,452,314 | 6/1969 | Sapoff et al. | 338/22 R |
| 3,781,748 | 12/1973 | Bishop | 338/18 X |
| 3,887,785 | 6/1975 | Ahlport | 338/25 X |
| 4,103,275 | 7/1978 | Diehl et al. | 338/25 |
| 4,116,063 | 9/1978 | Leblanc et al. | 73/355 R |
| 4,129,848 | 12/1978 | Frank et al. | 338/25 X |
| 4,139,833 | 2/1979 | Kirsch | 338/25 X |
| 4,146,957 | 4/1979 | Toenshoff | 338/25 X |
| 4,183,136 | 1/1980 | Colla | 338/25 |

Primary Examiner—C. L. Albritton
Attorney, Agent, or Firm—Max Fogiel

[57] ABSTRACT

A bolometer has a holder and, secured in the same, a meander-shaped bolometer strip carried by the holder and composed of a carrier layer and a conductive layer of electrically conductive material which is atop of and carried by the carrier layer. An absorbent layer may also be provided.

8 Claims, 4 Drawing Figures

BOLOMETER

BACKGROUND OF THE INVENTION

The present invention relates to a bolometer, i.e. a device for measuring the energy of electromagnetic radiation in certain wave length regions by utilizing the change in resistance of a thin conductor caused by the heating effect of the radiation. The change in resistance is then measured by a Wheatstone bridge.

Devices of this type are already known and, in actual practice, usually utilize two bolometer strips which are as similar as possible and which are inserted into adjacent branches of the bridge circuit. Only one of these strips is exposed to the radiation so that an independence with reference to the ambient temperature is obtained. In a known bolometer the bolometer strip is constructed in form of a meandering conductor strip of gold or nickel which is supported on an insulating layer of magnesium oxide. The insulating layer is in turn arranged on an absorber layer of gold. It has been found that this strip construction is extremely sensitive to mechanical stresses because of the danger that the insulating layer may break. Moreover, it is difficult to manufacture such a strip because the insulating layer has a tendency to develop holes during the manufacture and this then results in shorting of the strip which thereby becomes unusable. Overall, the median life expectancy of a bolometer utilizing such a strip is therefore relatively short.

Another bolometer type is described in a publication of the Batell-Institute e.V., Frankfurt, Federal Republic of Germany, No. 479/0.5. In this construction the bolometer strip consists of a meander-shaped conductor of gold which is supported on a free insulating layer of aluminum oxide and has a radiation absorbing material coated over it. This construction has been found to have the disadvantage that the aluminum oxide layer—which is produced by anodizing—is brittle and therefore also cannot withstand mechanical stresses.

SUMMARY OF THE INVENTION

Accordingly, it is an object of the present invention to overcome the disadvantages of the prior art.

A more particular object of the invention is to provide an improved bolometer which avoids the aforementioned disadvantages.

A still more specific object of the invention is to provide an improved bolometer of the type mentioned above, wherein the bolometer strip has a significantly increased resistance to mechanical stresses, and the bolometer overall has a much improved lift time.

A further object of the invention is to provide such an improved bolometer which is highly reliable in operation and can be manufactured in a simple manner.

A concomitant object of the invention is to provide a bolometer of the type under discussion which has a small mass and therefore a low heat capacity, whereby a high radiation sensitivity with a small time constant is obtained.

In keeping with the above objects, and with still others which will become apparent hereafter, one aspect of the invention resides in a bolometer, in a combination which may comprise a holder; and a meander-shaped bolometer strip carried by the holder and comprising a carrier layer and a conductive layer of electrically conductive material atop the carrier layer and carried by the same.

The invention will hereafter be described with reference to two exemplary embodiments illustrated in the appended drawings. However, these are for purposes of explanation only and not to be considered limiting in any sense.

BRIEF DESCRIPTION OF THE DRAWING

FIG. 1b is a section taken on line A–B of FIG. 1a;

FIG. 1c is a section taken on line C–D of FIG. 1a; and

DESCRIPTION OF THE PREFERRED EMBODIMENTS

Figure 1A:
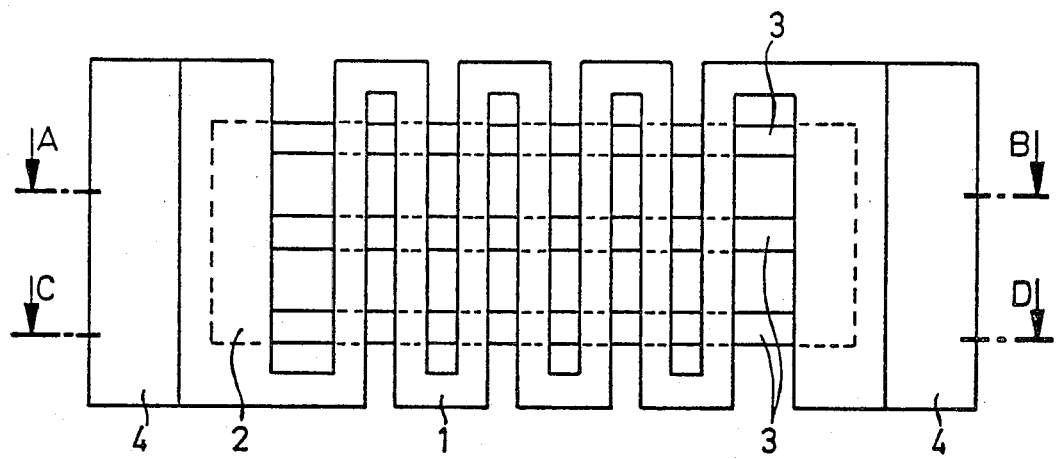
FIG. 1a is a top-plan view of a bolometer according to one embodiment of the invention.
Figure 1B:
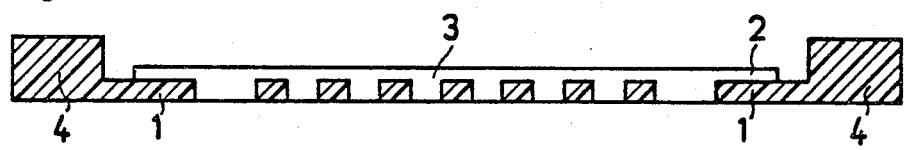
Figure 1C:
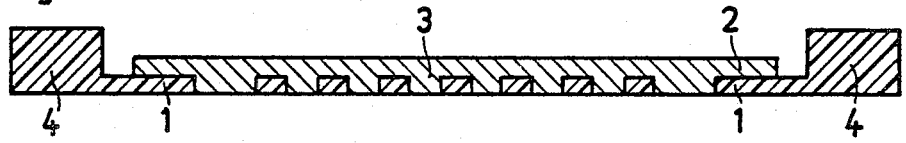

A first embodiment of a bolometer according to the present invention is illustrated in FIGS. 1a–1c which show a bolometer having a quasi-freely carrying bolometer strip 1 in form of a meander-shaped conductive strip or layer which may be of gold or nickel, or another material found suitable for such layers. The bolometer strip is produced by forming a gold or nickel layer on a not illustrated carrier layer, preferably by galvanizing, and thereupon structuring the gold or nickel layer by means of photolithography to form the illustrated meander-shaped bolometer strip 1. FIGS. 1a and 1c show that the supporting grid 2 of photo resistive material or another suitable organic substance is deposited on this meander-shaped bolometer strip 1; the grid 2 has three longitudinally extending strips 3 which engage in comb-like fashion into the cutouts—or rather spaces—of the meander-shaped bolometer strip 1. The grid 2 affords the quasi-free-supported meander-shaped bolometer strip 1 sufficient mechanical stability and strength. Subsequently, the bolometer strip 1 together with the grid 2 is pulled off the carrier layer and is clamped with its reinforced end pieces 4, which serve as contacts, into a none-illustrated holder. The strips 3 of the grid 2 may be arranged in any desired manner, for example, in crosswise configuration, depending on the desired mechanical strength and stability of the strip 1. A bolometer utilizing the strip illustrated in FIGS. 1a–1c is particularly suitable for measuring radiation flux in nuclear fusion machines.

Figure 2:
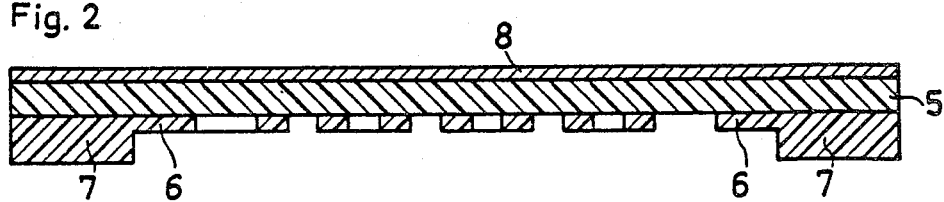
FIG. 2 is a section through a bolometer according to another embodiment of the invention.

A further embodiment of the invention is illustrated in FIG. 2 in cross-sectional view. In this embodiment an insulating layer 5 is provided, and so as to be taut. A bolometer strip 6 of gold or nickel with reinforced end pieces 7 is produced on one side of the layer 5 in the manner described above. On the other side of the insulating layer 5 an absorber layer 8 is deposited, for example, a layer of gold. The layer 5 is preferably of polyimide or another suitable organic synthetic plastic having adequate thermal and resistance to electrical breakdown. The deposition of the bolometer strip 6 and of the absorber layer 8 on the insulating layer 5 may be effected in any of the known ways, e.g. by galvanizing, by sputtering or by vapor deposition. A bolometer using a strip of the type discussed with reference to FIG. 2 is particularly suitable for measuring the radiation energy from the infrared to the ultraviolet range of the spectrum.

The invention as hereinbefore described is not to be considered limited to the illustrated embodiments, since it is susceptible of various modifications all of which are intended to be embraced within the scope of the appended claims.

What is claimed is:

1. A bolometer arrangement comprising: a meander-shaped electrically conductive layer having a resistance dependent on the intensity of absorbed radiation; a supporting layer for supporting said meander-shaped conductive layer and having cutouts for receiving portions of said meander-shaped conductive layer, said supporting layer being comprised of photoresist.

2. A bolometer as defined in claim 1, wherein said photoresist supporting layer has separate strip-shaped regions formed from cutouts and extending over the individual turns of said meander-shaped conductive layer.

3. A combination as defined in claim 1, said supporting layer being grid-shaped.

4. A combination as defined in claim 1, said layers having portions lying in portions of the other layer.

5. A combination as defined in claim 1, said conductive layer having cut-outs, and said carrier layer having portions located in said cutouts.

6. A combination as defined in claim 1, said supporting layer being of electrically insulating organic synthetic plastic material.

7. A combination as defined in claim 6, said synthetic plastic material being polyimide.

8. A combination as defined in claim 6, said conductive layer being located on one side of said electrically insulating supporting layer; and further comprising an absorber layer on the other side of said supporting layer.

* * * * *